United States Patent [19]

Schwartz et al.

[11] 4,203,693

[45] May 20, 1980

[54] DUPLICATING MACHINE FOR TUBULAR KEYS

[75] Inventors: Jerome Schwartz; Joseph Levitt, both of Philadelphia, Pa.

[73] Assignee: Taylor Lock Company, Philadelphia, Pa.

[21] Appl. No.: 928,580

[22] Filed: Jul. 27, 1978

[51] Int. Cl.² .............................................. B23C 1/16
[52] U.S. Cl. ................................... 409/81; 51/100 R; 76/110
[58] Field of Search ......................... 90/13.05; 76/110; 51/100 R; 409/81, 82, 83

[56] References Cited

U.S. PATENT DOCUMENTS

| 1,307,378 | 6/1919 | Segal | 51/100 R |
| 1,895,849 | 8/1932 | Haubroe | 90/13.05 |
| 1,978,009 | 10/1934 | Caron | 90/13.05 |
| 3,418,882 | 12/1968 | Brand | 409/82 |
| 3,495,482 | 2/1970 | Simon | 76/110 |
| 3,807,276 | 4/1974 | Oliver | 76/110 X |
| 3,818,798 | 6/1974 | Kotov et al. | 90/13.05 |
| 4,022,107 | 5/1977 | Falk | 409/81 |

FOREIGN PATENT DOCUMENTS 4714559  6/1968  Japan .......................... 76/110

Primary Examiner—William R. Briggs
Attorney, Agent, or Firm—Robert K. Youtie

[57] ABSTRACT

A key duplicating machine for tubular keys wherein a key carrier is mounted to axially rotate the tube of the key blank and longitudinally shift the tube for endwise movement into a rotary cutter and rotary indexing to successive cuts.

11 Claims, 5 Drawing Figures

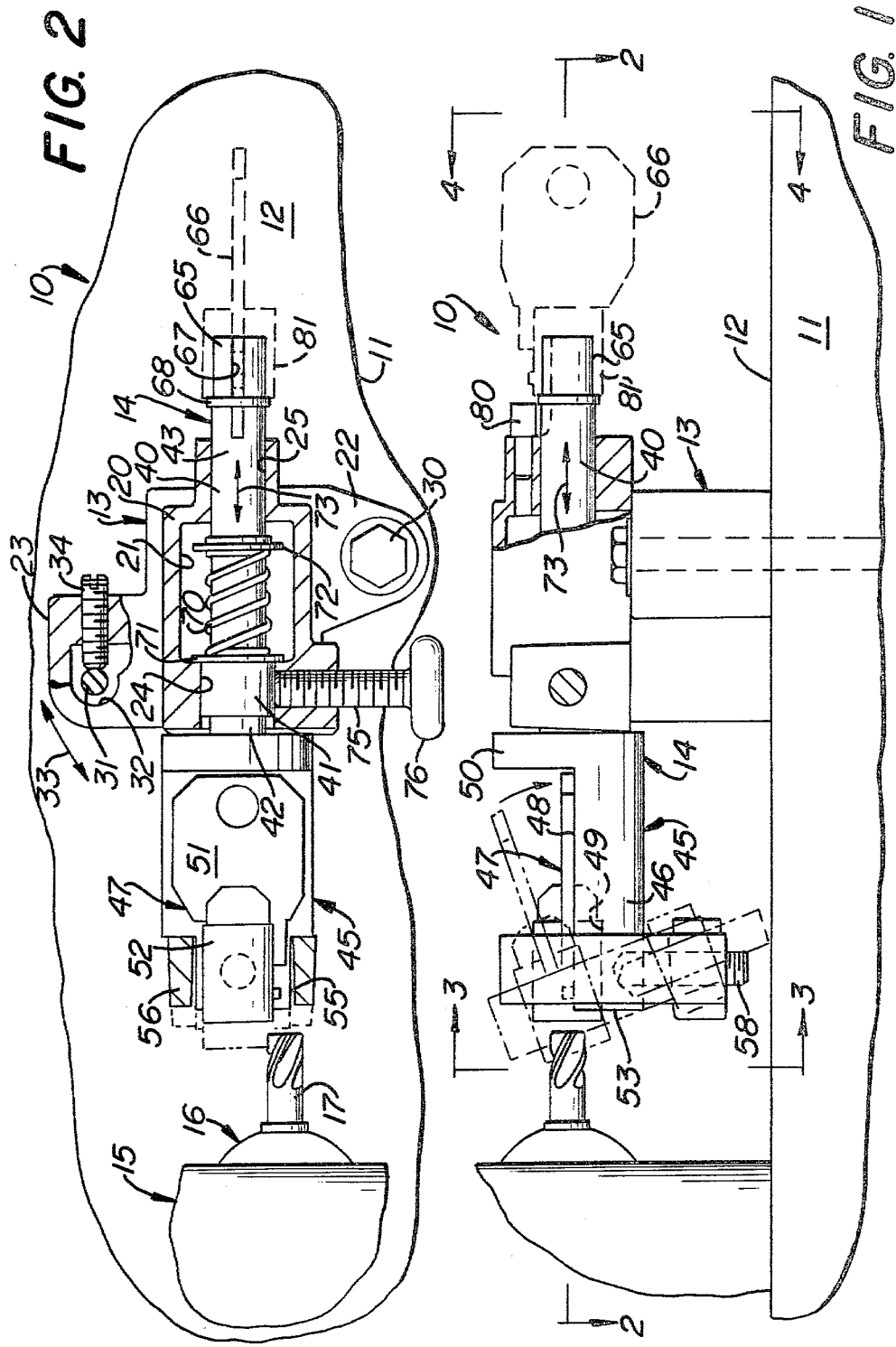

DUPLICATING MACHINE FOR TUBULAR KEYS

BACKGROUND OF THE INVENTION

While there have, in the past, been proposed a variety of machines for cutting tubular keys, such prior machines have not been entirely satisfactory, primarily in that they required operation from a code, or were extremely complex in construction, difficult to operate, and expensive to manufacture and maintain. Examples of such prior art are found in U.S. Pat. Nos. 1,978,009; 2,129,087; 2,645,978; 3,148,589; 3,388,619; 3,418,882; and 3,495,482.

SUMMARY OF THE INVENTION

It is among the important objects of the present invention to provide a duplicating machine for cutting tubular key blanks which is extremely easy to operate, relatively quick to duplicate a key, and extremely simple and compact construction for economy in manufacture and requiring little operating space.

It is a further object of the present invention to provide a tubular key cutting machine for duplicating tubular keys, which may be quickly and easily set up for proper operation by persons with little skill or experience.

It is a further object of the present invention to provide a tubular key cutting and duplicating machine which is capable of high accuracy and precision, and which is durable and reliable for a trouble free life of long continued use.

Other objects of the present invention will become apparent upon reading the following specification and referring to the accompanying drawings, which form a material part of this disclosure.

The invention accordingly consists in the features of construction, combinations of elements, and arrangements of parts, which will be exemplified in the construction hereinafter described, and of which the scope will be indicated by the appended claims.

BRIEF DESCRIPTION OF THE DRAWINGS

FIG. 1 is an elevational view showing a tubular key duplicating machine constructed in accordance with the teachings of the present invention, partly broken away to permit a larger scale, partly in section for clarity of understanding, and illustrating a key blank loading position in phantom.

FIG. 2 is a sectional plan view taken generally along the line 2—2 of FIG. 1.

DESCRIPTION OF THE PREFERRED EMBODIMENT

Figure 3:
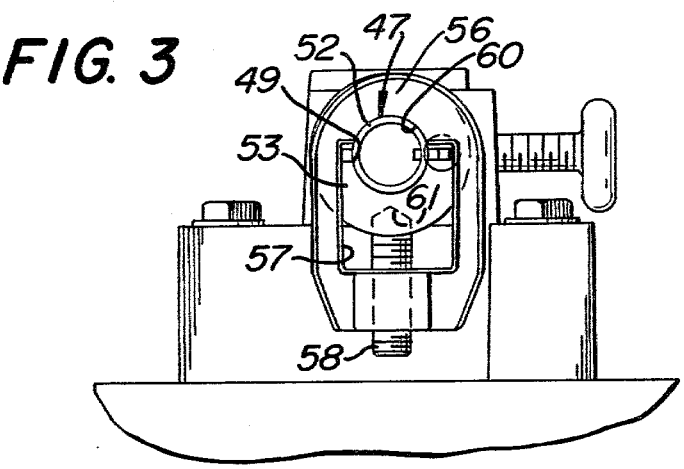
FIG. 3 is a sectional elevational view taken generally along the line 3—3 of FIG. 1.

Referring now more particularly to the drawings, and specifically to FIGS. 1 and 2 thereof, the tubular key duplicating device of the present invention is there generally designated 10, and includes a base or table 11 which may have an upper generally horizontal surface 12. Superposed on the base or support 11, on the upper surface 12 may be a mount or housing 13 which mounts an elongate key carrier 14 for both longitudinal shifting and rotative indexing movement, as will appear more fully hereinafter.

Spaced from the housing 13, beyond one end of the elongate key carrier 14, is a motor or rotary drive motive means 15 carrying a chuck or tool holder 16 facing toward the adjacent end of key carrier 14 and provided with a rotary cutting tool 17 extending toward the key carrier. The motor 15 may be fixed on the upper surface 12 of base 11 by any suitable means, while the chuck or tool holder 16 is rotatable about an axis extending longitudinally of the key holder 14, the cutter or cutting tool 17 being of an end mill type and axially rotatable about the axis of chuck 16.

The mount or housing 13 may include a medial hollow portion 20, having an interior hollow 21 which may open downwardly to the upper base surface 12, and a pair of laterally outwardly projecting lugs or ears 22 and 23. The intermediate or hollow central portion 20 includes a pair of generally horizontally extending, aligned through holes or bores 24 and 25 which are in alignment with each other generally longitudinally of the axis of cutter 17. Thus, the aligned through bores or holes 24 and 25 open from opposite ends of the housing 13 into the interior hollow 21 of the medial housing portion 20.

A suitable locking fastener or bolt 30 may extend downwardly through the outstanding lug or ear 22 for threaded engagement into the nether region of base 11. An additional locking means or threaded bolt, as at 31 on the opposite side of mount 13 may depend through outstanding lug or ear 23 for threaded engagement into the base 11. The locking member 31 may depend spacedly through the ear 23, as through an enlarged opening 32, while the fastener 30 may pass closely through the lug 22. By this means, upon loosening of the fasteners 30 and 31, the mount or housing 13 is angularly shiftable or rotatably about the axis of bolt 30 within the limits imposed by clearance about the bolt 31. This permits of housing adjustment, as in the directions of arrows 33, for purposes appearing more fully hereinafter.

In addition, positioning or adjustment means may include a setscrew 34 extending generally longitudinally of carrier 14 in threaded engagement through the ear or lug 23 to define an adjustable stop for limiting engagement with one side of the fastener or bolt 31, as best seen in FIG. 2. If desired, an additional setscrew may be threaded in lug 23 to engage the other side of bolt 31.

The key carrier 14 includes an elongate generally cylindrical shaft or shank 40 which extends longitudinally through the interior hollow 21 of medial housing portion 20 outwardly of and beyond the bores 24 and 25. Within the bore 24 may be mounted a bushing or bearing 41 rotatably surrounding and journalling the received portion 42 of shank or shaft 40. The shank or shaft portion 43 received within bore 25 may be directly rotatably supported or journalled.

Exteriorly of the hollow housing portion 20, on the innerside thereof adjacent to bore 24, the shaft portion 42 is provided with an enlargement in the form of a work holder 45, which includes a work supporting portion 46 extending generally longitudinally from the shaft 40 and offset therefrom to locate a specifically configured work piece or tubular key blank 47 generally axially of the shaft. That is, the work supporting surface 48 of work holder 45 is generally flat for receiving the generally flat head of a tubular key blank, and recessed adjacent to its outer end, as at 49 to receive the tubular stem of a key blank. The inner end of work holder 45 may be provided with a transverse extension or projection 50.

The key blank 47 is a conventional tubular key including a flat head 51 adapted to rest on the work holder support surface 48, and a tubular extension or stem 52 adapted to extend outwardly beyond the outer end 53 of the work holder.

The outer end region of the work holder 45 is reduced, as at 55, and loosely surrounding the reduced outer end region is a clamp or collar 56. The clamping collar 56 is provided with an internal through opening 57 loosely receiving the reduced work holder end portion 53. That is, the central through opening 57 of clamping collar or ring 56 is elongate in one direction, the vertical direction as shown in FIG. 3, and receives the work holder end portion or extension 53 in a manner permitting of vertical movement of the collar relative to the work holder. As noted hereinbefore, the work holder end portion 53 is provided with a recess 49 to conformably receive a lower portion of the tubular stem 52 of a tubular key blank 47. Complementary to the recess 49, the interior of the clamping collar 56 is provided with a downwardly facing generally semi-cylindrical recess 60 for conformably receiving and engaging with the upper side of a tubular key blank stem having its lower side engaged in the recess 49. This is best seen in FIG. 3.

It is also seen in FIG. 3 that the threaded clamping element 58 passes in threaded engagement through the clamping ring or collar 56 at a location remote from the interior recess 60, and extends into entering engagement with a recess 61 on the underside of work holder end portion 53.

Thus, it will be appreciated that upon tightening of the threaded member 58, as by rotation to move the latter toward the receiving work holder portion 53, the clamping collar 56 is caused to cooperate with the portion 53 for combined clamping engagement with the key blank stem 52.

By loosening rotation of the threaded member 58, to relieve the above described clamping engagement, the clamping collar 56 may be canted or tilted with respect to the work holder 45, as shown in phantom in FIG. 1, for a purpose appearing presently. Also, it will be appreciated that the entire key carrier 14 may be rotated on its shank 40 to swing the work holder 45 about 90°, to expose the threaded member 58, which may be a socket screw, for access by a proper wrench or tool.

Projecting from the opposite or outer end of shank 40 of key carrier 14 may be a generally cylindrical, axial extension or holder 65, for holding engagement in the open end of a master or control key 66 to be duplicated. The control key holder or extension 65 may be provided with a longitudinal slot 67, and an external circumferential enlargement, shoulder or annular retainer 68, spaced inwardly from the free end of the holder or extension. The master or control key 66 is thus conformably engageable snugly on the extension 65, receiving an internal rib of the key stem in the slot 67 to maintain angular positioning of the key relative to the shaft 40, and engaging the shoulder 68 to maintain proper longitudinal positioning of the control key relative to the shaft.

Interiorly within the hollow 21 of the medial housing portion 20, there is circumposed about the shaft 40 a coil compression spring 70 interposed between and in end engagement with an end flange 71 on bushing 41, and a retaining ring, annular shoulder or circumferential flange 72 fixed on the shank 40.

Thus, the entire key carrier 14 is longitudinally shiftably mounted in the housing or mount 13 and resiliently urged longitudinally outwardly or away from the cutter 17, say to a limiting position with the enlarged work holder 45 in abutting engagement with the adjacent outer surface of the mount or housing 13. The directions of key carrier shifting movement are indicated by arrows 73.

In order to maintain the key carrier 14 in a selected longitudinal position of its shifting movement, out of the limiting or home position, there is provided a retaining member or setscrew 75 extending threadedly into the hollow housing portion 20 for end engagement with the bushing 41 to depress the latter into holding engagement with the received shank portion 42. Manual actuating means 76 may be provided on the releasable retaining member or screw 75 for selectively rotating the latter.

Figure 4:
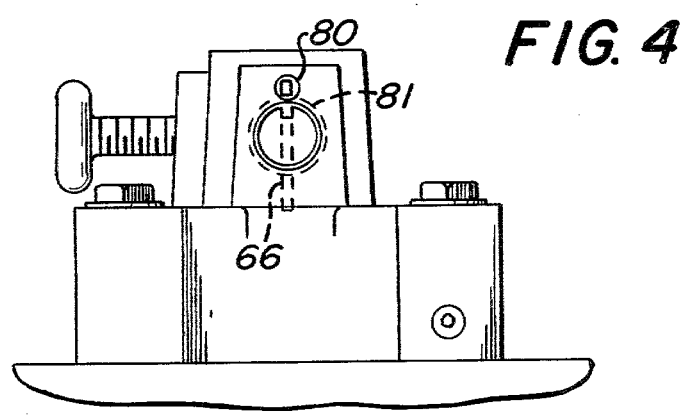
FIG. 4 is a sectional elevational view taken generally along the line 4—4 of FIG. 1.

Projecting from the hollow medial portion 20 of mount 13, outwardly away from the cutter 17 and in general parallelism with the latter, may be a pin or guide 80. The pin or guide 80 may be generally cylindrical and extend in adjacent parallelism with the shank or shaft 40, directly over the shaft portion 43 extending outwardly toward the control holder or extension 65, in the condition shown in FIG. 1. As best seen in FIG. 1, the cylindrical guide 80 is sufficiently close to the shaft 40 so as to engage in end abutment with the tubular stem 81 of a control key 66 on the extension 65 when the control key and extension are shifted leftward. This is also shown in FIG. 4.

Similarly, the key blank 47 in the work holder 45 is located with respect to the generally cylindrical cutter or tool 17 for end engagement therebetween upon leftward shifting movement of the key carrier. More specifically, the key blank 47 is oriented with respect to the cutter 17 in the same manner as is the control key 66 oriented with respect to the guide 80. However, it will be seen that the cylindrical cutter 17 is laterally or horizontally adjacent to the key blank stem 52 while the guide 80 is vertically adjacent to the control key stem 81.

In order to operate the instant tubular key duplicator 15, one may follow the procedure set forth below:
 a. Place a blank tubular key on the control holder or extension 65 of the shaft or spindle 40 and rotate the blank key and shaft to position the key head generally horizontally. This will position the key holder surface 48 generally vertically.
 b. By grasping the key blank on the extension 65, push the shank 40 inwardly until the key blank tube or stem abuts the pin or guide 80.
 c. Lock the spindle or shank 40 into position by rotating the retainer or lock screw 75.
 d. Place the same or another tubular key blank into the clamping ring or collar 56, canting the latter as required, and with the key blank on the work holding surface 48 shift the blank into end engagement with the cutter 17.
 e. Tighten clamping screw 58 to securely clamp the key blank in the key holder touching the cutter.
 f. Loosen retaining member 75 to permit spring retraction of the key carrier and blank.
 g. Place master or control key to be duplicated properly on the holder or extension 65.

h. Turn on motor to rotate cutter 17 and effect longitudinal shifting and rotative indexing of key carrier and blank by following guide pin 80 with control or master key.

Figure 5:
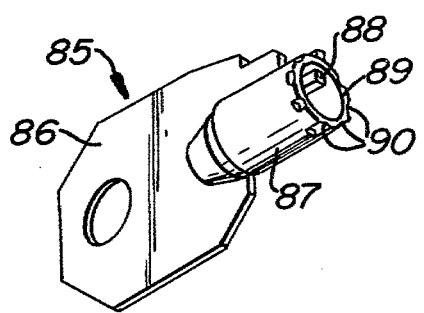
FIG. 5 is an end perspective view showing a tubular key of the type to be duplicated by the instant device.

A conventional tubular key is shown in FIG. 5, there being designated 85, and including a generally flat plate or head 86, from one end of which extends a generally hollow cylindrical or tubular stem 87 having its outer end open and provided with a longitudinal locating ridge 88 extending internally and externally of the tubular stem. About the external periphery of the tubular stem 87, opening through the stem and edge 89, are provided a plurality of angularly spaced apart cutouts 90. Each of the cutouts 90 is defined by a hollow, concave semi-cylindrical surface, all being of the same radius of curvature, in general parallelism with each other and the axis of stem 87. However, the longitudinal depths of the several cuts 90 may vary in accordance with the particular code.

It will now be apparent that the guide pin 80 is configured to engage successively in each of the several cuts or recesses 90, upon rotative movement of the control key 85 and longitudinal shifting thereof while loaded on the control holder or extension 65. Consequently, the cutter 17 cuts, successively, recesses in a key blank loaded in the work holder, which recesses correspond to the recesses 90.

Should it be necessary to set the position of the cutter 17 relative to the work (a tubular key blank), the locking bolts 30 and 31 are loosened and the mount 13 pivoted about the bolt 30 so that a key blank in the work holder overlaps the cutter by approximately 0.010 inches. In this position, the setscrew 34 is brought into engagement with the bolt 31 and the locking bolts 30 and 31 are tightened.

From the foregoing, it is seen that the present invention provides a tubular key cutting and duplicating machine which is extremely quick and simple to operate, having a minimum of moving parts, readily adjustable, extremely durable and reliable throughout a long useful life, and which otherwise fully accomplishes its intended objects.

Although the present invention has been described in some detail by way of illustration and example for purposes of clarity of understanding, it is understood that certain changes and modifications may be made within the spirit of the invention.

What is claimed is:

1. A duplicating machine for tubular keys, said machine comprising: a base, a generally cylindrical cutter rotatably mounted about an axis and having a cutting face transverse to said cutter axis; on said base and having a radius generally equal to the radius of a tubular key notch, a mount at a fixed location on said base spaced from said cutter, a key carrier supported by said mount for shifting movement on an axis parallel to the axis of said cutter and rotative movement to spaced angular locations relative to the axis of said carrier, a work holder on said carrier for gripping engagement with the stem of a blank key to be cut by said cutter upon longitudinal carrier shifting movement, a control holder on said carrier for holding a key to be duplicated with its stem in fixed generally parallel and aligned relation with the stem of a gripped key blank, and a guide having a radius generally equal to the radius of a tubular key notch fixed relative to the axis of said cutter, said guide having an axis parallel to the axis of said cutter and located in similar relation to a key on the control holder as a key blank held by the work holder is located relative to the cutter, whereby control holder movement by a key to be duplicated in guided relation with said guide effects carrier shifting and rotative movement for corresponding cutting by said cutter of a key blank held by said work holder.

2. A duplicating machine according to claim 1, in combination with adjustable positioning means positioning said mount on said base for adjustment of said fixed location relative to said cutter, said adjustable positioning means comprising a pivot remote from said work holder and generally normal to the cutter axis for swinging the blank laterally toward and away from the cutter.

3. A duplicating machine according to claim 1, in combination with resilient means yieldably urging said carrier longitudinally of and away from said cutter.

4. A duplicating machine according to claim 1, in combination with releasable retaining means for releasably retaining said carrier in position along said shifting movement relative to said mount, to facilitate loading a key blank in said work holder.

5. A duplicating machine according to claim 1, said work holder comprising a clamp configured for releasably clamping the stem of a tubular key blank.

6. A key duplicating machine according to claim 1, said control holder comprising an outstanding extension for conformable engagement in the stem of a tubular key to be duplicated.

7. A duplicating machine according to claim 1, said cutter being laterally horizontally adjacent to said work holder, for minimum overall height.

8. A duplicating machine according to claim 7, in combination with adjustable positioning means positioning said mount on said base for adjustment relative to said cutter, said positioning means comprising an upright pivot for swinging said carrier generally radially of said cutter in a generally horizontal plane, and releasable locking means for locking said positioning means in a selected position.

9. A duplicating machine according to claim 1, said carrier comprising a shaft longitudinally and rotatably slidable relative to said mount, said work holder being fixed relative to and located on one end of said shaft adjacent to said cutter, and and said control holder being fixed relative to and located on the other end of said shaft for fixed relative positioning of said key blank and control key.

10. A duplicating machine according to claim 9, said work holder comprising a clamp for releasably clamping a key blank, and said control holder comprising an outstanding extension conformably engagable into the stem of a tubular key to be duplicated.

11. A duplicating machine according to claim 7, said guide being located over said control holder for convenient visual access.

* * * * *